United States Patent [19]

Best et al.

[11] Patent Number: 5,224,584
[45] Date of Patent: Jul. 6, 1993

[54] EXPANDABLE POWERED CONVEYORS

[75] Inventors: John W. Best; Bobby K. Flippo; Paul W. Irby, all of Jonesboro, Ark.

[73] Assignee: Northstar Industries, Inc., Jonesboro, Ark.

[21] Appl. No.: 893,801

[22] Filed: Jun. 4, 1992

Related U.S. Application Data

[63] Continuation-in-part of Ser. No. 642,012, Jan. 16, 1991, Pat. No. 5,147,025.

[51] Int. Cl.$^5$ ............................................. B65G 13/02
[52] U.S. Cl. .................................. 198/782; 198/790; 193/35 TE
[58] Field of Search .................. 193/35 TE; 198/581, 198/588, 594, 632, 782, 790, 812, 861.1; 414/529, 532

[56] References Cited

U.S. PATENT DOCUMENTS

| | | | |
|---|---|---|---|
| 1,841,278 | 1/1932 | Dallas | 248/277 |
| 1,849,205 | 3/1932 | Rypinski | 198/632 |
| 2,590,359 | 3/1952 | Zopf | 198/632 |
| 2,796,969 | 6/1957 | Russel | 198/588 |
| 2,826,290 | 3/1958 | Barski | 193/35 TE |
| 2,897,955 | 8/1959 | Morrow | 198/830 |
| 2,988,190 | 6/1961 | Tucker | 193/35 TE |
| 3,117,662 | 1/1964 | Wahl et al. | 193/37 |
| 3,139,173 | 6/1964 | Greaves | 198/632 |
| 3,258,097 | 6/1966 | Wahl | 193/37 |
| 3,276,558 | 10/1966 | Guske et al. | 193/35 TE |
| 3,944,037 | 3/1976 | Stease | 193/35 TE |
| 4,164,338 | 8/1979 | Myron | 414/529 X |
| 4,266,650 | 5/1981 | Patel et al. | 193/35 TE |
| 4,297,753 | 11/1981 | Langren | 198/632 X |
| 4,852,712 | 8/1989 | Best | 193/35 TE |
| 4,860,878 | 8/1989 | Mraz et al. | 198/812 X |

FOREIGN PATENT DOCUMENTS

| | | | |
|---|---|---|---|
| 1006797 | 4/1957 | Fed. Rep. of Germany . | |
| 0045815 | 3/1986 | Japan | 198/594 |
| 0075725 | 4/1986 | Japan | 198/782 |
| 9008717 | 8/1990 | PCT Int'l Appl. | 198/812 |
| 2012700 | 8/1979 | United Kingdom . | |
| 2147866 | 5/1985 | United Kingdom | 198/812 |

Primary Examiner—Joseph E. Valenza
Assistant Examiner—Cheryl L. Gastineau
Attorney, Agent, or Firm—Kilpatrick & Cody

[57] ABSTRACT

Chain driven expandable powered conveyors utilizing lazy tong structures. A first embodiment of such conveyors employs elongated rollers which are connected to sprockets driven by one or more drive chains. The chains follow a tortuous path through the conveyor structure allowing efficient and effective transmission of power from a power source to the sprockets and elongated rollers regardless of the extent to which the conveyor is expanded or contracted. A second embodiment, which also employs elongated rollers, includes sprockets powered by a chain that in turn apply power to elongated rollers using drive belts. This embodiment avoids exposure of drive chain at the surface of the conveyor, allows accumulation of product on the conveyor and features other advantages. A third embodiment employs skate wheels rather than elongated rollers. A drive chain applies power to drive sprockets on the surface of the conveyor which propel product on the conveyor.

38 Claims, 9 Drawing Sheets

EXPANDABLE POWERED CONVEYORS

This is a continuation-in-part of U.S. Ser. No. 07/642,012 filed Jan. 16, 1991 entitled "Expandable Powered Roller Conveyor" U.S. Pat. No. 5,147,025.

This invention relates to flexible and expandable powered roller conveyors.

BACKGROUND OF THE INVENTION

Flexible expandable roller conveyors which utilize lazy tong support frames or structures have been widely used for many years. Lazy tongs are structures formed of a set of parallel bars, most of which are pivotally connected at their end points and midpoints, to corresponding bars in a transversely oriented set of parallel bars so that the structure may be extended and retracted with scissor-like action. Such structures for conveyors are disclosed in U.S. Pat. No. 3,276,558 issued Oct. 4, 1966 to Guske, et al. and U.S. Pat. No. 4,266,650 issued May 12, 1981 to Patel, et al., which are both incorporated herein by this reference. The conveyors of those patents include lazy tong structures which are connected by a number of axles or rods, each of which carries several rollers. Such conveyors are sometimes known as "skate wheel" conveyors because the rollers are, or are similar in construction and appearance to, roller skate wheels.

U.S. Pat. No. 4,852,712 issued Aug. 1, 1989 to Best discloses another form of gravity roller conveyor utilizing lazy tong structures which include, among other things, additional support for the skate wheels. That document is incorporated herein by this reference. These durable conveyors are particularly useful to move packages and other items from one point to other points in the plant or warehouse and in loading or unloading trucks, airplanes, or containers. They may be flexed and extended or retracted with minimum effort to accommodate the desired location, vehicle, or container.

The nature of the lazy tong structure allows such conveyors to be retracted and stored in a compact fashion in which successive axles and rollers are positioned nested together immediately adjacent to one another. The distance between successive axles and rollers increases as the conveyor is expanded to its operative position for conveying articles. The expandable and retractable nature of such conveyors has conventionally precluded using a drive belt for moving articles, so that workers are typically required to propel articles carried by the conveyors manually or to rely upon gravity.

For many years, rigid, non-lazy tong conveyors have employed elongated, tubular-shaped rollers instead of skate wheels for various materials handling purposes in applications such as those, for instance, where articles are shaped or configured inappropriately for conveyance on skate wheel surfaces. There have also been motorized or powered variations of such conveyors to address situations where gravity conveyors are inappropriate. Such motorized elongated roller conveyors have, in the past, employed polymeric or plastomeric tubular belts around the elongated rollers for applying power to rotate the rollers.

SUMMARY OF THE INVENTION

The present invention provides lazy tong flexible and expandable roller conveyors which utilize one or more drive chains and elongated rollers or skate wheels to help propel articles along the conveyor surface. The chains ensure positive transmission of power from the motor or other power source along the length of the conveyors regardless of extent of retraction or expansion. The drive chain or chains are interlaced over a number of sprockets, freewheels and/or guide rollers connected to the lazy tong structure, in a continuous tortuous loop. As the conveyors are expanded or retracted, the interlaced drive chains retain approximately the same path length and thus are able to power the sprockets and rollers in order to propel product or material on the conveyors at any desired conveyor length or curve. Chain tensioners may be used to accommodate slack and draw the chain against the sprockets in order to accommodate the expansion and retraction of the conveyors.

In a first embodiment of such conveyors, as shown in FIGS. 1-4, a pair of lazy tong structures is spanned by elongated rollers. The ends of some or all rollers are connected to sprockets over which the drive chain travels. Between elongated rollers and connected to the midpoint connections or crux connections of the lazy tong bars are guide roller structures. The guide roller structures carry guide rollers which are aligned with the sprockets and under which the drive chains travel. Freewheels coaxially aligned with the sprockets and guide rollers guide the drive chain on its return to the power source. As the conveyor is expanded, the elongated rollers and guide roller structures separate in scissors or accordion fashion, but move closer to one another vertically, so as to avoid undue elongation of the drive chain path. Chain tensioners may be used to accommodate any such path length change.

In a second embodiment of the invention, as shown in FIGS. 9-12, the elongated rollers are powered by polymeric or plastomeric belts that ar driven by sprockets connected to the midpoint or crux connections in the lazy tong structures. The sprockets are in turn driven by one or more drive chains. The sprockets are positioned in alternating fashion in the lazy tong structure with guide rollers, so that the drive chain paths are defined by the sprockets and the guide rollers. Guide rollers and freewheels carry the drive chains on the return path to the power source.

This second embodiment is counterintuitive, because it employs more complex and elaborate linkages connected to the lazy tong structures in order to accommodate the guide rollers, and it requires a number of belts for driving the elongated rollers not required in the first embodiment. Conveniently, however, the belts may be of the type utilized in conventional non-expandable, non-lazy tong elongated roller structures. Furthermore, the absence of chains on the conveyor surface, as in the first embodiment, promotes product safety. Perhaps even more significant, however, is that the use of belts, unlike drive chains directly connected to the elongated rollers, allows the conveyor to "accumulate" product being conveyed by creating desired slippage as the conveyor is heavily loaded, but nevertheless allows sufficient positive traction to propel product as required.

A third embodiment of the present invention, as shown in FIGS. 5-8, utilizes drive chains in connection with skate wheels. The chains travel over sprocket wheels on alternating rows of skate wheels and under guide rollers aligned with the other sets of alternating roller skate wheels. A plurality of freewheels coaxially aligned with the sprocket wheels an guide rollers carries the chain on its return path. Chain tensioners are used to accommodate changes in path length as the conveyor is expanded or contracted.

It is an object of the invention to provide expandable conveyors which use elongated rollers or skate wheels and are powered by drive chains.

It is an additional object of the present invention to provide expandable conveyors featuring elongated rollers which are driven by drive chains in order to ensure efficient transmission of power from the power source to the rollers.

It is an additional object of the present invention to provide expandable conveyors using elongated rollers and drive chains which may be expanded and contracted in order to accommodate various applications and environments without significant effect on drive chain path length or ability of the chain to transmit power to the rollers.

It is an additional object of the present invention to provide expandable conveyors with elongated rollers utilizing drive chains which feature increased product safety characteristics.

It is an additional object of the present invention to provide expandable conveyors using elongated rollers powered by drive chains and belts in a manner that permits accumulation of products or articles on the conveyor surface.

It is an additional object of the present invention to provide expandable conveyors with elongated rollers powered by drive chains using a structure that employs components found in conventional, nonexpandable conveyors in order to simplify manufacture and maintenance and decrease production costs.

It is another object of the present invention to provide expandable conveyors using elongated rollers that are durable, dependable, cost effective, exhibit reduced maintenance costs and efforts, accommodate various environments, and otherwise exhibit characteristics that are superior to other expandable or non-expandable, lazy tong or non-lazy tong conveyor structures.

Other objects, features, and advantages of the present invention will become apparent with reference to the remainder of this document.

DETAILED DESCRIPTION OF THE DRAWINGS

FIGS. 1-4 show a first embodiment of an expandable conveyor according to the present invention. Conveyor 10 comprises generally an expandable section 12, a portion of which includes frame 16, which may be supported by legs 14 and casters 18. Legs 14 and casters 18 are conventional. Legs 14 are preferably adjustable in height to accommodate various environments, and casters 18 may be omitted, include brakes, and otherwise be formed or constructed as desired. Frame 16 in the embodiment shown in FIGS. 1-4, is located at one end of conveyor 10 and is adapted to support a power source, chain tensioning devices and other components and structures discussed below. Frame 16 may, but need not, support elongated rollers, guide rollers or other structure further discussed below. Frame 16 may be formed of stamped components, channel, fasteners and other devices and materials as desired in order to serve its intended functions, including supporting the power source, chain tensioners, legs 14 and other components and devices.

Frame 16 is connected to a pair of lazy tong structures 20A and 20B. Lazy tong structures 20 form the expandable section 12 of conveyor 10 and are constructed as disclosed in the Best patent mentioned above and incorporated herein. Each lazy tong structure 20 includes two sets of parallel oriented bars 22, a first set 23 and a second set 25. The bars 22 in first set 23 are generally parallel to one another, as are the bars 22 in the second set 25. For a plurality of bars 22 in a structure 20, each bar 22 in first set 23 (with exceptions, for instance, at the ends of lazy tong structure 20) is connected to three bars in second set 25: (1) to a first bar 22 in second set 25 at a top pivotal connection 24; (2) to a second bar 22 in second set 25 at a generally midlength crux connection 21 and (3) to a third bar 22 in second set 25 at a bottom pivotal connection 26. The lazy tong structures 20 may be expanded and contracted in scissors-like or accordion-like fashion by exerting tension or compression at the ends of, or along the length of, structure 20. They may also be curved left or right a desired by exertion of lateral force on conveyor 10 in order to accommodate various applications and environments.

Any or all of crux connections 21, top pivotal connections 24 and/or bottom pivotal connections 26 may be formed using bolts or other fasteners through holes in bars 22, portions of axles that support components such as rollers extending through holes in bars 22, or as otherwise desired. In the embodiment shown in FIG. 2, for instance, axles 30 which support elongated rollers extend through holes in the bars 22 to form top pivotal connections 24.

Figure 1:
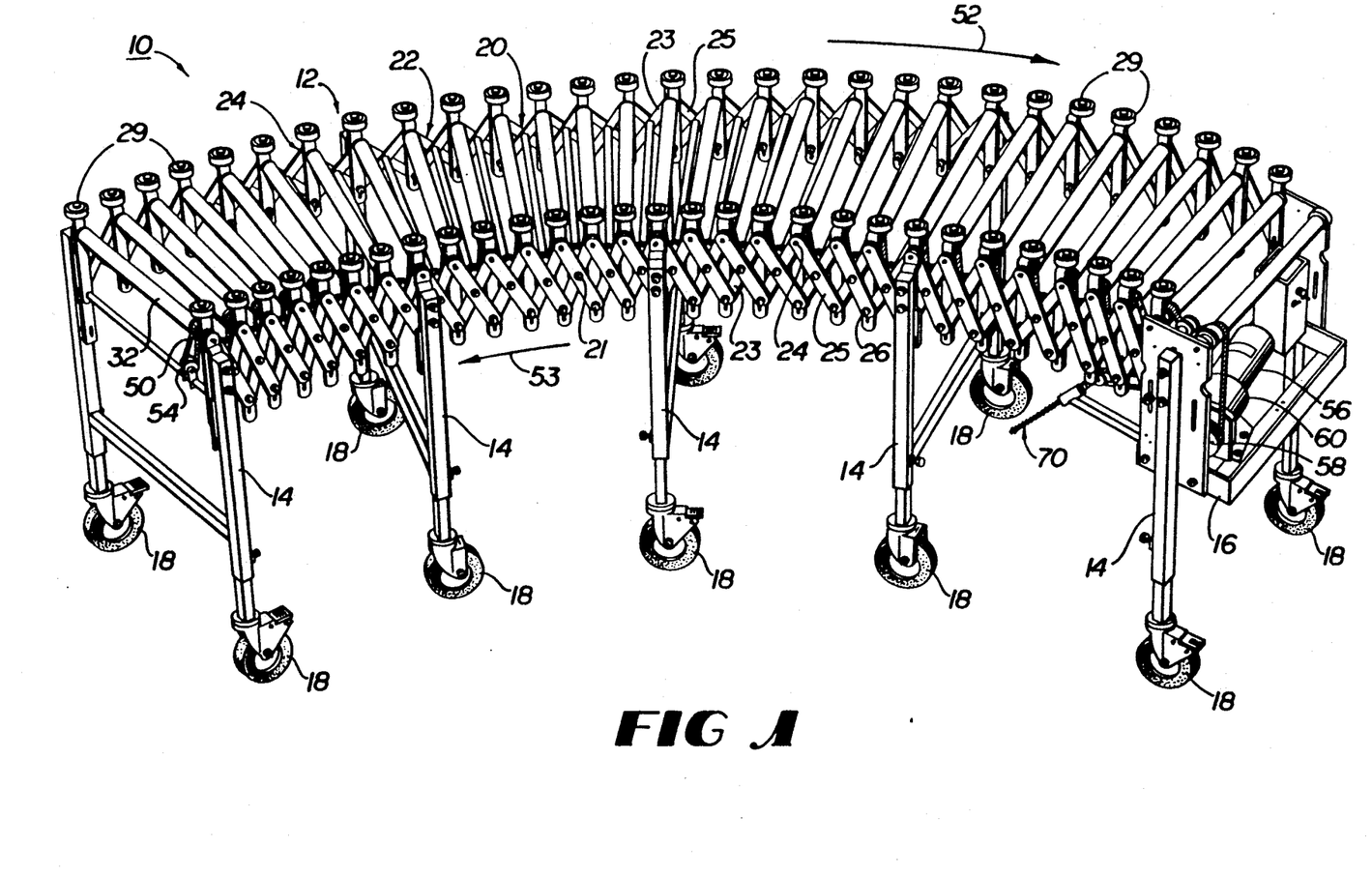
FIG. 1 is a perspective view of a first embodiment of an expandable conveyor of the present invention employing elongated rollers.
Figure 2:
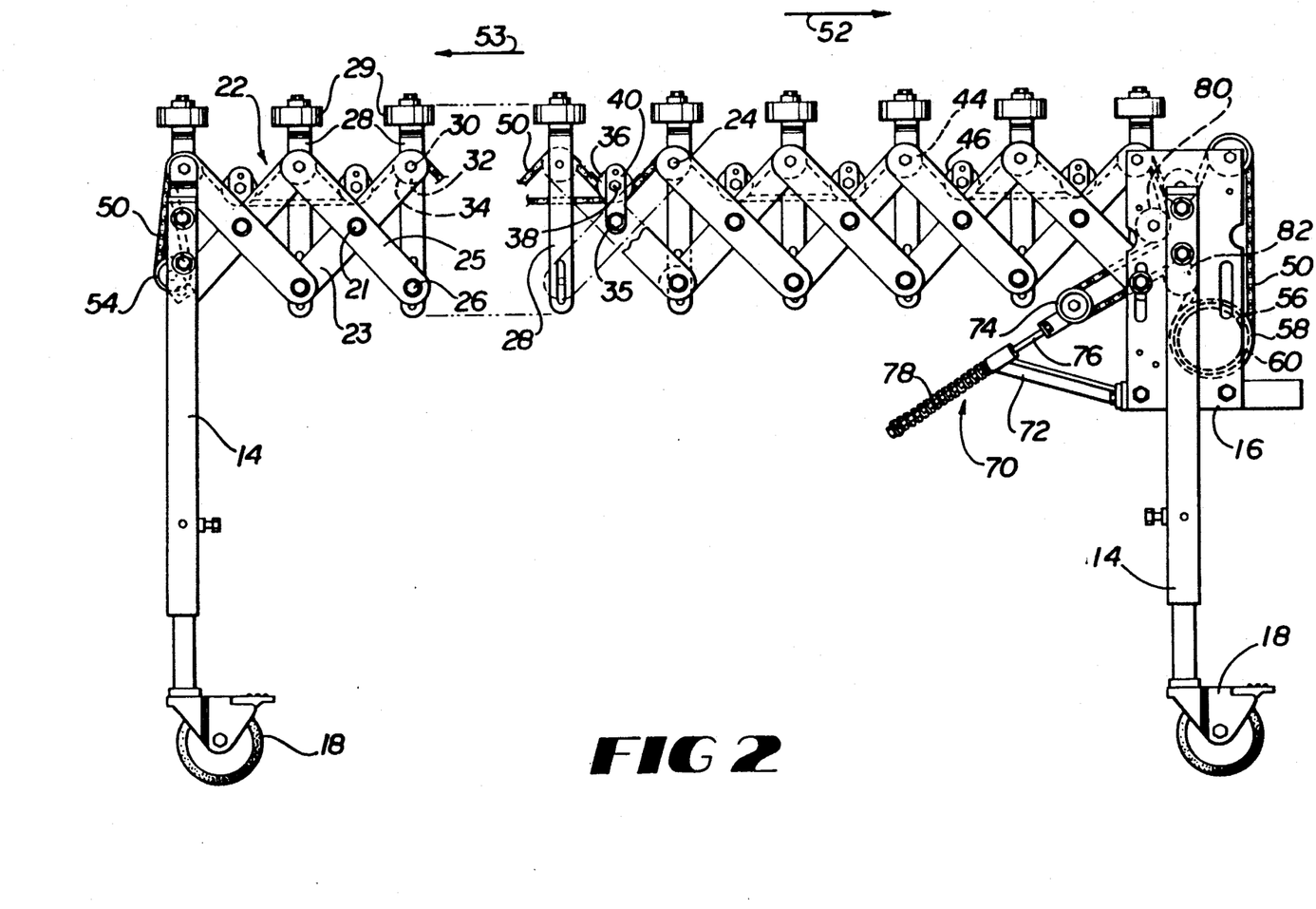
FIG. 2 is a side elevational view of a portion of the conveyor of FIG. 1.

Side rollers 29 are preferably utilized in the conveyor 10 shown in FIGS. 1-4 to guide products and materials being conveyed on the surface of conveyor 10. In this embodiment, and as perhaps more clearly shown in FIG. 2, each side roller 29 is supported by a side roller brace 28. As shown in FIG. 2, brace 28 is oriented generally vertically and is connected to a top pivotal connection 24 and a bottom pivotal connection 26 in a lazy tong structure 20. In this embodiment, axle 30 extends through a hole in brace 28 adjacent top pivotal connection 24 and the bottom portion of brace 28 contains a slot which receives in sliding fashion the fastener that forms a portion of bottom pivotal connection 26. Brace 28 is generally L-shaped, the foot of the L forming a substantially horizontal surface to which side roller 29 is connected in rotating fashion. Side roller 29 may be a conventional skate wheel, a skate wheel especially adapted for conveyor structures, or as otherwise desired. Bushings and/or bearings may be used, as described in the Best patent mentioned above.

In the embodiment shown in FIGS. 1-4, elongated roller axles 30 span top pivotal connections 24 of lazy tong structures 20 to support elongated rollers 32 in conventional fashion. Elongated rollers 32 may be of the type conventionally used in non-lazy tong, non-expandable elongated roller conveyors, and they may be supported on roller axles 30 in conventional fashion. The roller axles 30 may be connected to lazy tong structures 20 at places other than top pivotal connections 24 and as desired. In the embodiment shown in FIGS. 1-4, the axles 30 extend through parallel bars 22 to form a portion of top pivotal connections 24.

A sprocket 34 is connected to each of a plurality of elongated rollers 32 in a fashion that allows the roller 32 to be driven by and rotate with the sprocket 34. Sprocket 34 may be mounted rigidly to roller 32, may contain a ratchet mechanism to allow slippage in one direction, be mounted coaxially and connected by splines or pins, or be connected as otherwise desired in order to have the capacity to transfer power to rollers 32.

Each elongated roller axle 30 also preferably carries a upper freewheel 44 rotatably mounted on axle 30 generally coaxially with the roller 32 and sprocket 34. Upper freewheel 44 is preferably free to rotate with respect to roller 32 and sprocket 34. Upper freewheel 44 may be a sprocket adapted to receive a drive chain, a roller with flanges to capture and guide the drive chain, or adapted and formed as otherwise desired.

Connected to lazy tong structures 20 intermediate the elongated rollers 32 in the embodiment shown in FIGS. 1-4 are guide roller structures 35. In this embodiment, the guide roller structures 35 span the two lazy tong structures 20 and are connected to structures 20 at crux connections 21. They may be attached to lazy tong structures 20 at other locations and as otherwise desired, however. In the embodiment shown in FIGS. 1-4, for instance, guide roller structure 35 comprises a guide roller axle 38 which is received in a pair of guide roller links 40, each of which links 40 is connected to corresponding crux connection 21 in a lazy tong structure 20. Guide roller axle 38 may alternatively extend through and form a portion of crux connection 21 or be attached to lazy tong structures 20 as otherwise desired. Alternatively, guide roller structure 35 may be a structure that is simply cantilevered off of one lazy tong structure 30 in a manner that does not require an entire axle 38 that spans lazy tong structures 20. In any event, a guide roller 36 is mounted in rotating fashion on the axle 38 or structure 35, together with a lower freewheel 46 which may be of construction similar to the same as guide roller 36. Roller 36 and/or freewheel 46 may be, as is the case with upper freewheel 44 discussed above, a sprocket adapted to receive a drive chain, a roller with flanges to capture and guide the drive chain, or adapted and formed as otherwise desired. Bushings or bearings may be used for mounting freewheels 44 and 46 and guide rollers 36 on their respective support structures or axles. Lower freewheels 46 are preferably substantially aligned with upper freewheels 44 in the direction of the lazy tong structures (longitudinally), in order that the drive chain may be carried in one direction by the freewheels 44 and 46. Similarly, guide rollers 36 are preferably substantially aligned with sprockets 34 to carry the drive chain. The term "substantial" in this sense means that the drive chain may be carried by the freewheels 44 and 46 and the guide rollers 36 and sprockets 34 without experiencing undue friction or forces imposed by them.

Figure 3:
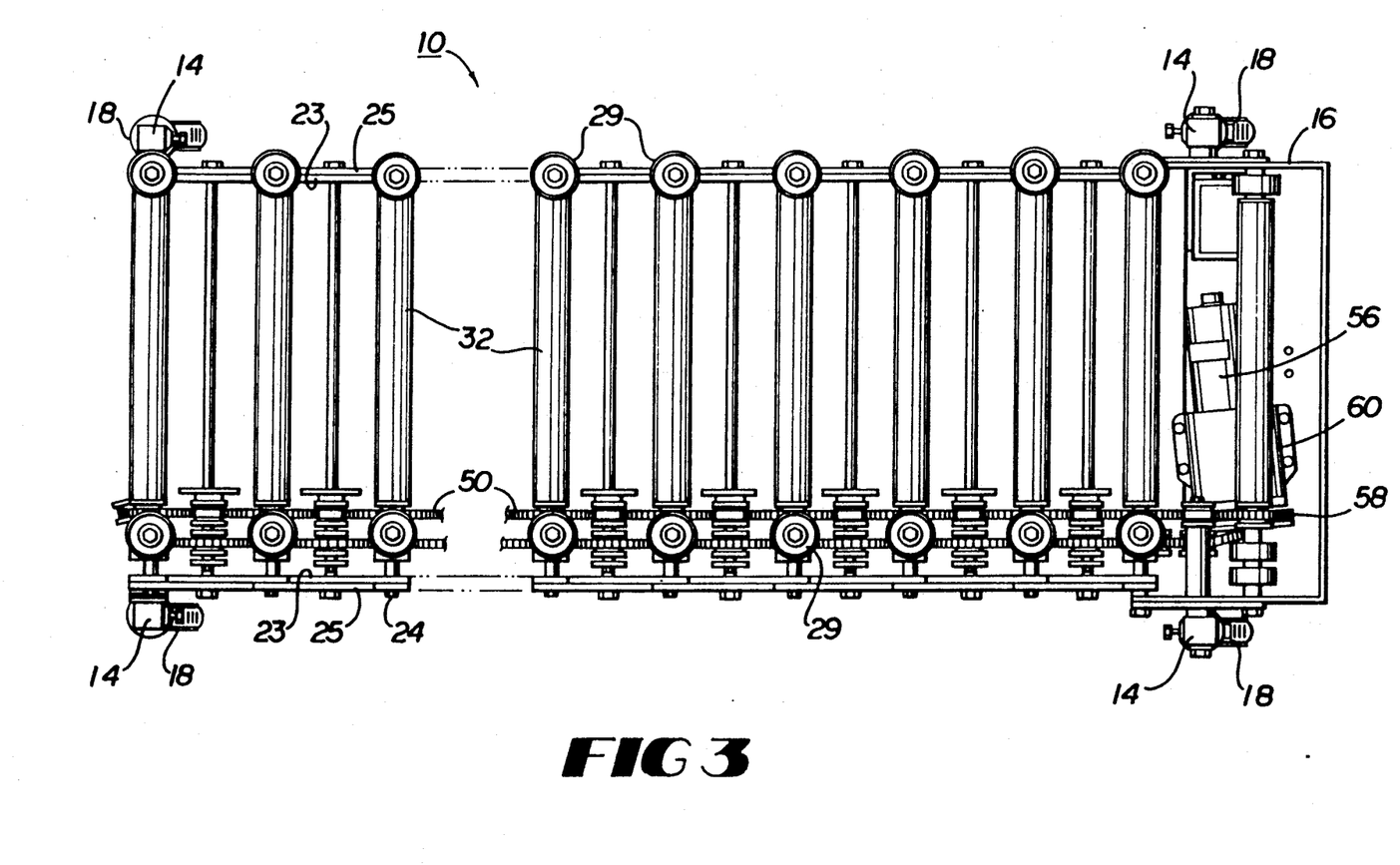
FIG. 3 is a top plan view of a portion of the conveyor of FIG. 1.
Figure 4:
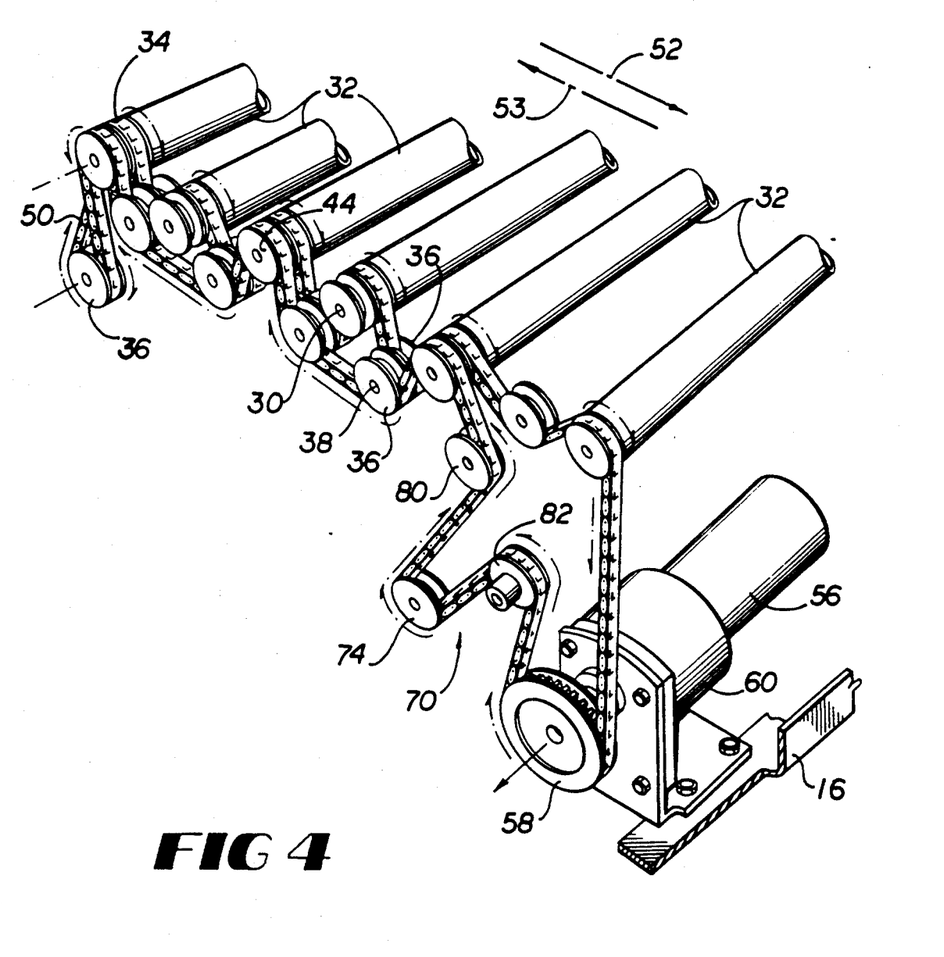
FIG. 4 is a perspective, schematic view of a portion of the conveyor of FIG. 1, focusing on drive chain path.
Figure 5:
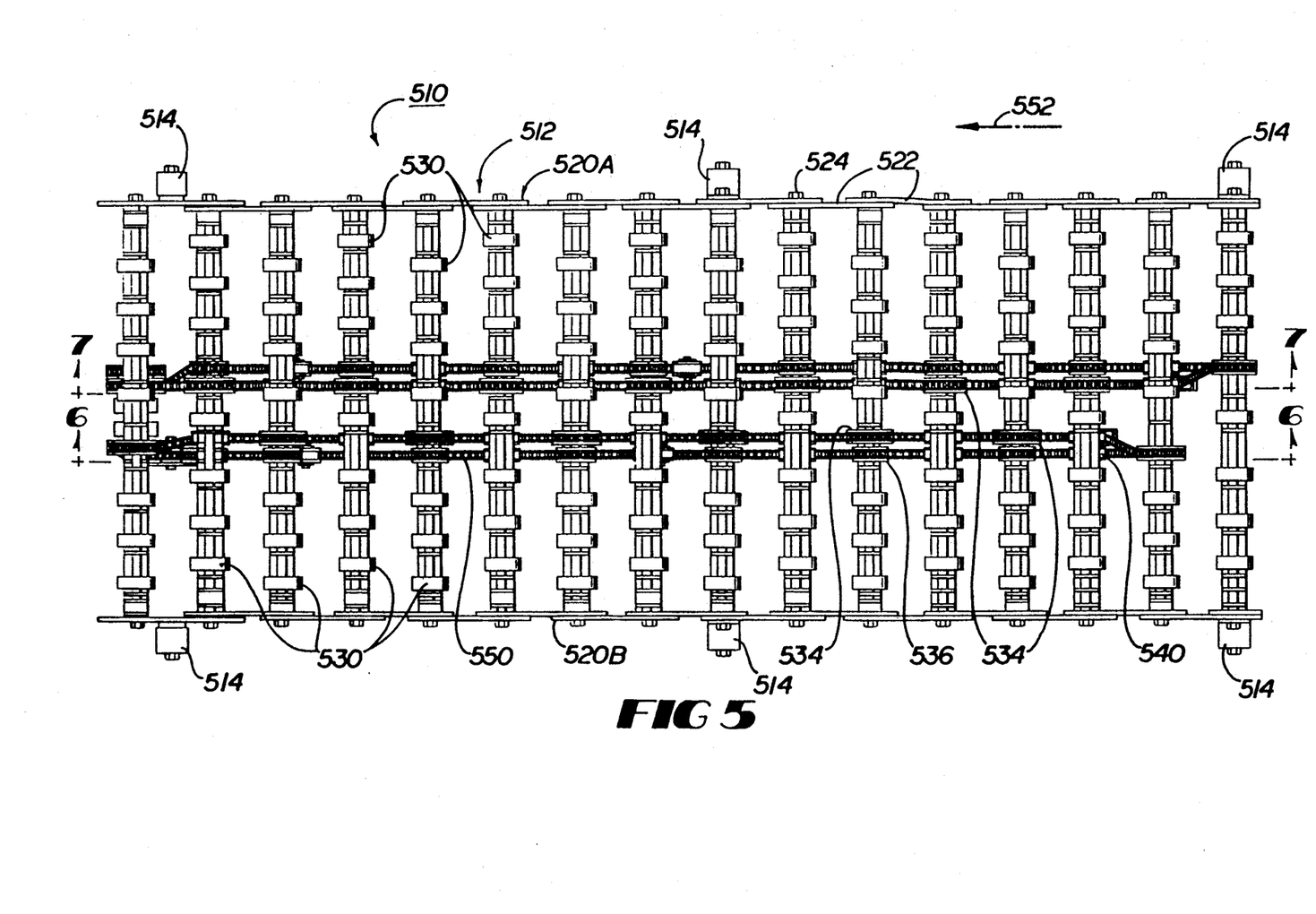
FIG. 5 is a top plan view of a third embodiment of the present invention, which uses skate wheels rather than elongated rollers.

As perhaps best shown in FIGS. 3 and 4, a drive chain 50 is carried by sprockets 34, guide rollers 36, upper freewheels 44 and lower freewheels 46. Drive chain 50 may be of conventional structure and of the type typically and conventionally used in conveyor products. In the embodiment shown in FIGS. 1-4, it extends over sprockets 34, and under the guide rollers 36 substantially aligned with sprockets 34, in drive direction 52 which, in this embodiment, is toward the power source. The chain 50 also travels over upper freewheels 44 and under lower freewheels 46 in the other or return direction 53 and changes direction on return roller 54 at one end of conveyor 10. Return roller 54 is connected as desired to conveyor 10; in the embodiment shown in FIG. 1, it is connected to a brace that spans a pair of legs 14, and is angled to accommodate the lateral distance necessitated by the direction change. At the opposite end of conveyor 10, the power source 56, which in the embodiment shown in FIGS. 1-4 is a motor which may be of variable speed type, is connected via a transmission 60, which may be of variable reduction ratio, to a drive sprocket 58. Sprocket 58 delivers power to the drive chain 50 in order to power sprockets 34 and thus elongated rollers 32.

Drive chain 50 thus forms a path defined, at least in part, by elongated roller sprockets 34 and upper freewheels 44 which are generally coaxially mounted, and, intermediate those components, guide rollers 36 and lower freewheels 46 which are generally coaxially mounted. The chain 50 forms a tortuous path, as shown perhaps best in FIG. 4, in which it preferably travels over a sprocket 34 for every elongated roller 32 and, between those sprockets 34, under a guide roller 36. In the other direction, construction of the conveyor 10 is simplified by having the chain 50 travel over an upper freewheel 44 located on alternating elongated rollers 32, and under two successive lower freewheels 46 between two upper freewheels 44. As the lazy tongs structures 20 are compressed and the conveyor 10 contracts, the vertical distance between the sprockets 34 and upper freewheels 44, on the one hand, and the guide rollers 38 and the lower freewheels 46, on the other hand, increases to absorb a decrease in lateral distance between those components. The length of drive chain path 62 is thus altered perhaps less appreciably than would initially be thought, because of the positioning of sprocket 34, upper freewheel 44, guide roller 36 and lower freewheel 46. Other configurations may also be employed to accomplish this objective, including using more or fewer of each of sprockets 34, upper freewheels 44, guide rollers 36, or freewheels 46, and/or altering their placement and support structures in the structure of conveyor 10.

Additionally, a tensioner 70, as shown perhaps best in FIGS. 2 and 4, may be employed. Tensioner 70 is any device which controls tension in chain 50 to draw it against sprockets 34 and drive sprocket 58. In the embodiment shown in FIG. 2, for instance, tensioner 70 is attached to frame 16 using a brace 72 which is formed of channel. Brace 72 receives a shaft 76 in sliding fashion. A tensioner pulley 74 which rides chain 50 is attached to a first end of shaft 76, while a tensioner spring 78 draws the pulley 74 against the chain 50 in order to absorb slack in chain 50. The tensioner 70 may be adapted to push the chain 50 rather than pull it, or as otherwise desired. The tensioner crevasse pulleys 80 and 82 may be used to route chain 50 to pulley 74 in a manner that minimizes space occupied by the loop of chain 50 extending to and around pulley 74 for safety and other purposes.

FIGS. 9-12 show a second embodiment of a conveyor 910 according to the present invention which utilizes elongated rollers. This embodiment employs a drive chain and polymeric or plastomeric belts to power the rollers. Conveyor 910 once again, as in the first embodiment, contains a frame 916 with an expandable section 912, legs 914 and casters 918. Lazy tong structures 920A and B are formed generally as described above in the discussion of the first embodiment. Parallel oriented bars 922 are connected in a manner such that a first bar 922 in a first set of parallel bars 923 is typically (but not always) connected to three bars 922 in a second set of parallel bars 925: (1) to a first bar 922 at a top pivotal connection 924; (2) to a second parallel bar 922 at a crux connection 921 and (3) to a third parallel bar 922 at a bottom pivotal connection 926. Exceptions to this rule may be found at, for instance, each end of the conveyor 910, where bars 922 may not be the subject of all three connections.

Figures 11, 12:
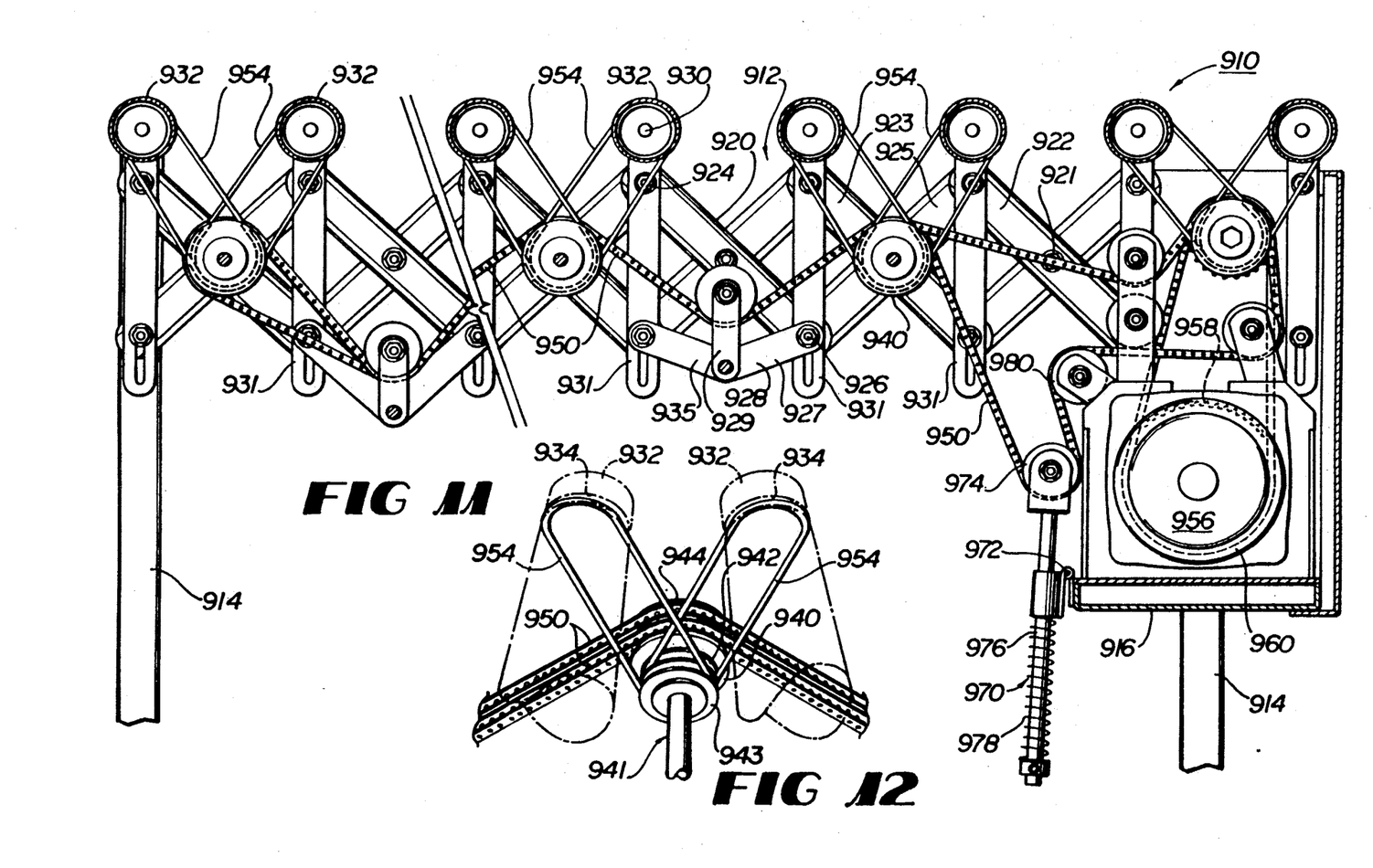
FIG. 11 is a side elevational/partial cross-sectional view of a portion of the conveyor of FIG. 9.
FIG. 12 is a perspective schematic view of a portion of the conveyor of FIGS. 9-11.

In the structure shown in FIGS. 9-12, elongated rollers 932 which may be connected to elongated roller axles 930 in rotating fashion or otherwise, span all or a portion of the distance between lazy tong structures 920A and 920B. Rollers 932 may feature a circumferential groove 934 to receive a drive belt as discussed below. Rollers 932 and roller axles 930 may be of the type conventionally used in roller conveyors, or they may be structured as otherwise desired and connected to any suitable portion of lazy tong structures 920. In the preferred embodiment, rollers 932 and axles 930 are connected to a plurality of braces 931 which may in turn be connected, in substantially vertical fashion, to the top pivotal connections 924 and bottom pivotal connections 926 of the lazy tong structures 920. As shown in FIG. 11, braces 931 may be connected to top pivotal connections 924 by the fasteners that extend through those connections, and may feature slots in their lower ends which receive fasteners from bottom pivotal connections 926 in a sliding fashion to accommodate vertical distance changes between the connections 924 and 926 as the conveyor 910 is expanded or contracted. The slots may just as easily be featured in the upper parts of the braces 931. Braces 931 may also be omitted from the structure, if desired, and the rollers 932 connected to the top pivotal connections 924 or at other locations.

In the embodiment shown in FIGS. 9-12, the drive chain path is defined in part by drive sprockets which are not coaxially aligned with elongated rollers 932. Instead, in this embodiment, a plurality of sprockets 940 are positioned along the length of the lazy tong structures 920 and below the top surface of conveyor 910. In the embodiment shown in FIGS. 9-12, as perhaps best shown in FIG. 11, sprocket structures 939 are preferably connected, directly or indirectly, to crux connections 921. The drawings show each sprocket structure 939 carrying a sprocket 940 on a sprocket axle 941 which in turn is connected to crux connections 21. The axle 941 may, but need not, form a portion of crux connections 921 by, among other means, extending through holes in parallel bars 922 to form crux connections 921. A sprocket 940 is mounted on the axle 941 in rotating fashion. Also mounted on axle 941 in a manner to rotate with sprocket 940 are a first orbital pulley 942 and a second orbital pulley 943 for carrying drive belts as described below. These are shown schematically in FIG. 12. The pulleys may be rigidly mounted to sprocket 940, formed of the same piece, be connected by splines or pins, or otherwise connected to sprocket 940 in order to receive power from sprocket 940. They may be fashioned as desired to capture tubular cross sectional, v-shaped cross sectional, or other configuration drive belts as desired for powering rollers 932. Also preferably rotatably mounted on sprocket structure 939 axle 941 is a freewheel 944 which is free to rotate with respect to sprocket 940. Freewheel 944 may be a sprocket adapted to receive a drive chain, a roller with flanges to capture and guide the drive chain, or adapted and formed as otherwise desired.

Positioned within conveyor 910 along the length of lazy tong structures 920, and intermediate sprocket structures 939, are guide roller structures 935. Guide roller structures 935 also preferably, but need not, span lazy tong structures 920. They carry a pair of guide rollers 936, a first of which is substantially aligned with the sprockets 940, and the second of which is substantially aligned with the freewheels 944 to assist chain travel. Once again, guide rollers 936 may be sprockets adapted to receive a drive chain, rollers with flanges to capture and guide the drive chain, or adapted and formed as otherwise desired in order to accommodate a drive chain with minimum friction and suitable durability, cost, and other desirable parameters.

Figure 9:
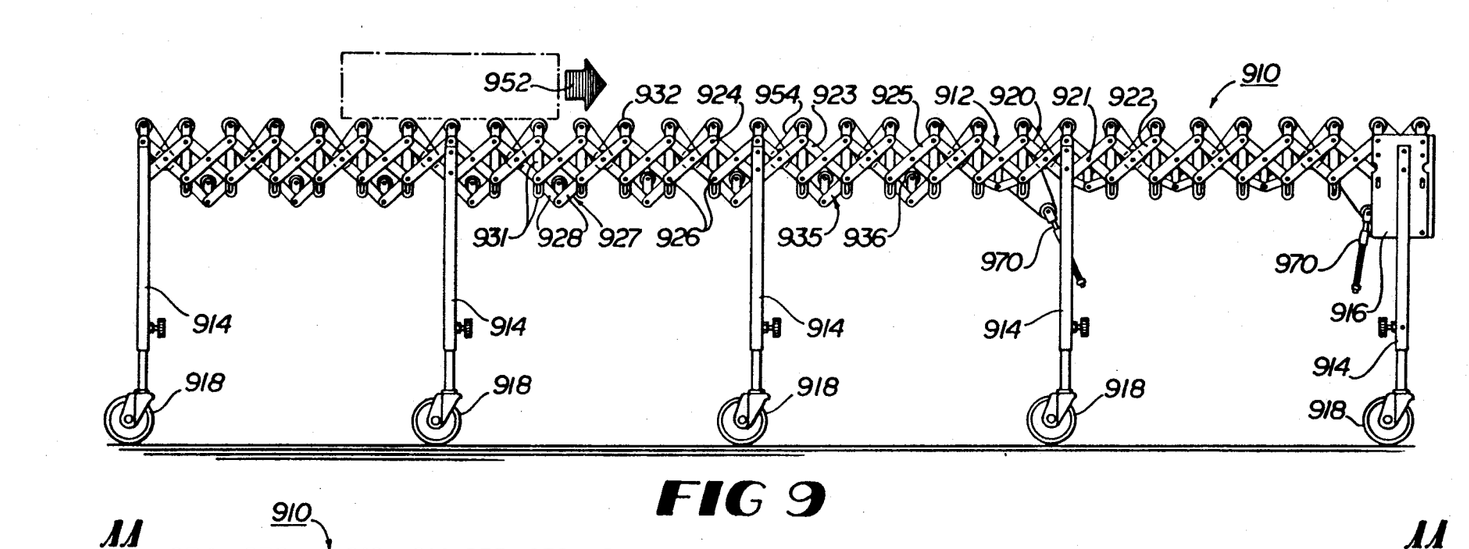
FIG. 9 is a side elevational view of a second embodiment of an expandable conveyor of the present invention that uses elongated rollers.
Figure 10:
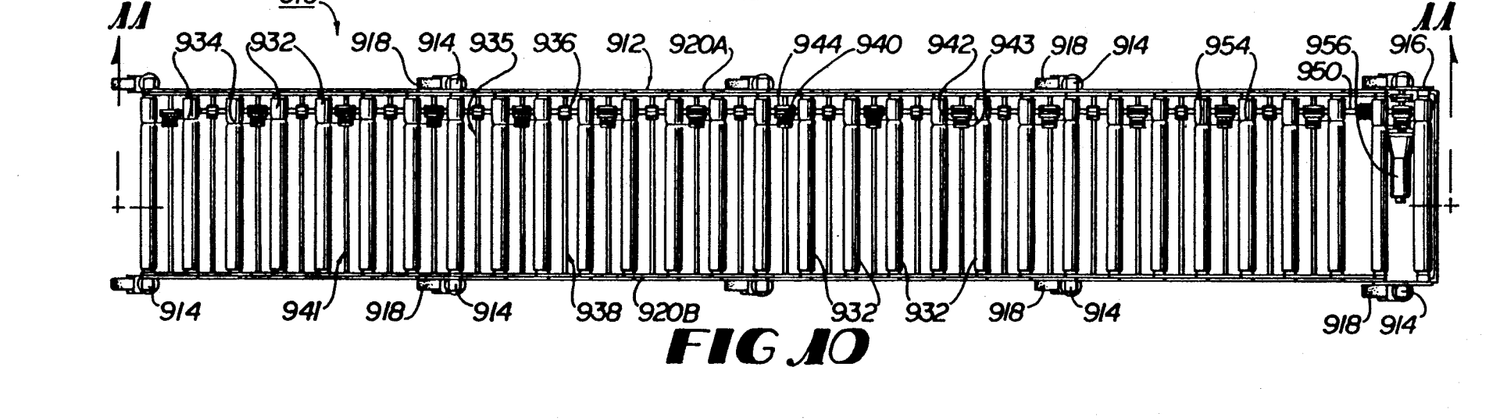
FIG. 10 is a top plan view of the conveyor of FIG. 9.

In the embodiment shown in FIGS. 9-12, guide roller structure 935 includes a guide roller axle 938 that is supported by a pair of chevron linkages 927 which are perhaps best shown in FIGS. 9 and 11. Each such linkage extends between vertical braces 931 which are attached to top and bottom pivotal connections 924 and 926, respectively.

In the preferred embodiment shown in FIGS. 9-12, chevron linkages 927 span two successive bottom pivotal connections 926 in alternating successive pairs. Accordingly, a chevron linkage 927 does not span successive bottom pivotal connections 926 between which may be found a sprocket structure 939. Chevron linkages 927 in the embodiment in the preferred embodiment contain a pair of lateral arms 928, each of which is connected at one end to a bottom pivotal connection 926 in the lazy tongs linkages 920, and the other end of which is connected to the other lateral arm 928 and to a vertical arm 929. All such connections are preferably pivot connections, and the other end of the vertical arm 929 is connected to a guide roller axle 938 which extends to a chevron structure 927 in the corresponding, opposite lazy tong structure 920. The chevron linkage 927 operates to force the axle 938 in a downward direction (away from the crux connection 921) as the lazy tong structures 920 are contracted. Each axle 938 preferably carries a pair of guide rollers 936, the first of which is substantially aligned with sprockets 940, and the second of which is substantially aligned with freewheels 944. Guide rollers 936 are mounted on axle 938 with freedom to rotate independent of each other.

It has been found that varying the length of the lateral arms 928 achieves at least two benefits: (1) causing the guide rollers 936 to move an appropriate distance vertically as the conveyor is expanded and retracted in order to cause the chain path to vary a minimal amount; and (2) causing the guide rollers 936 to move vertically an appropriate distance as the conveyor is expanded or retracted to create sufficient wrap of the chain 950 over sprockets 940. Appropriate wrap optimizes power delivery from chain 950 to sprockets 940 and minimizes friction. In the embodiment shown in FIG. 9, for instance, the first four sets of lateral arms 928 in chevron linkages 927 proceeding away from power source 956 and frame 916 are shorter than the lateral arms 928 in the next nine chevron linkages 927 extending in a direction from the power source and frame. The effect is thus to cause the guide rollers 936 away from the power source to move a greater vertical distance as the conveyor is expanded or retracted than the guide rollers 936 in the first four chevron linkages 927 nearest the power source. Lengths of lateral arms 928 may be varied as desired in order to accomplish the two purposes mentioned above and others (including, without limitation, parts inventory considerations). As examples, without limitation, the lateral arms 928 could vary in length from one chevron structure 927 to another, the lengths could all remain the same, or any desired number of sets of chevron linkages 927 could contain any desired number of lateral arms 928 of the same or constant length.

In a similar fashion, FIG. 9 shows the lengths of vertical arms 929 in chevron linkages 927 varying over the length of conveyor 910. The first four chevron linkages 927 closest to the power source 956 and frame 916 feature longer vertical arms 929, while the next four chevron linkages 927 feature intermediate length vertical arms 929 and the five chevron linkages 927 farthest from the power source 956 and frame 916 feature the shortest vertical arms 929. These varying lengths optimize the chain wrap over sprockets 940 in order to produce friction and deliver power efficiently from chain 950 to sprockets 940. Again, the lengths of vertical arms 929 may vary as desired, including, without limitation, from one chevron linkage 927 to another, or remain constant over one or more chevron linkages 927 in a set of such linkages 927 (as shown, for instance, with the three sets of FIG. 9). The length of vertical arms 929 may just as easily remain the same over the length of conveyor 910 if desired.

Drive chain 950 spans sprockets 940, guide rollers 936 and freewheels 944 to form a tortuous path through conveyor 910. A power source 956 is connected, as by a transmission 960 and power source chain 962 as shown in FIG. 11, to a power sprocket 958 across which chain 950 also travels. Tensioner 970, which may be of construction similar to or the same as that described above in discussion of the first embodiment, may also be used. A brace 972 is connected to frame 916 and generally biases a tensioner pulley 974 against chain 950. The shaft 976 and spring 978 version may be used, as desired, with or without a guide pulley 980.

A sprocket 940 driven by chain 950 is connected to one or more elongated rollers 932 using one or more drive belts 954 that ride rollers 932 and orbital pulleys 942 and 943 connected to sprocket 940. The preferred embodiment is shown schematically in FIG. 12. Any suitable similar configuration may also be used; for instance, belts 954 may ride pulleys connected to rollers 932 instead of riding their surfaces, and sprockets 940 and orbital pulleys 942 and 943 may be of a single piece. In the preferred embodiment, drive belts 954 are of the type conventionally used in non-expandable, non-lazy tong powered conveyors and are plastomeric and of tubular cross section. They may be belts of V-shaped cross section or as otherwise desired, however. In the preferred embodiment, the belts 954 are tensioned on pulleys 942 and 943 and on the groove 934 in elongated roller 932 in a manner that allows articles or product carried on the conveyor to "accumulate" or slow or stop as appropriate for loading and conveying conditions. This may be accomplished by allowing slippage to occur, such as between the belts 954 and the rollers 932, the belts 954 and the orbital pulleys 942 and 943, or the sprockets 940 and the orbital pulleys 942 and 943 as elongated rollers 932 meet a predetermined resistance to rotation as imposed by, for instance, product loaded on the conveyor 910.

Sprockets 940 and guide rollers 936 may be positioned in the conveyor 910 as desired to allow positive, efficient transmission of power from power source 956 to sprockets 940, but yet to accommodate changes in length in expandable section 912. In the embodiment shown in FIGS. 9-12, for instance, the vertical position of sprockets 940 remains approximately the same as the conveyor 910 is expanded or contracted, but chevron linkages 927 draw guide rollers 936 in a vertical direction to offset the change in horizontal distance between sprockets 940, and thus reduce and control any changes in length of the chain path. In the embodiment shown in FIGS. 9-12, a sprocket 940 is connected to alternating crux connections 921 in the lazy tong structures 920 and connected to two elongated roller structures 932 by drive belt 954. Not every roller 932 need be powered, however, and not every alternating crux connection 921 need be connected to a sprocket 940.

As in the first embodiment, power source 956 may be a motor of variable speed type, transmission 960 may feature a variable reduction ratio, and the speed of rotation of power sprocket 958 may be controlled as otherwise desired.

FIGS. 5-8 show a third embodiment of the present invention in the form of a conveyor which utilizes skate wheels rather than elongated rollers. The conveyor 510 includes an expandable section 512 with a frame 516 that may include legs 514 and/or casters (not shown) as desired, and as discussed above with respect to the first and second embodiments. The lazy tong structures 520, 520A and 520B, once again are formed of parallel-oriented bars 522 that are contained in a first set of parallel bars 523 and a second set of parallel bars 525 held to one another at top pivotal connections 524, crux connections 521, and bottom pivotal connections 526. A plurality of skate wheels 530 are supported on the conveyor using support structures as described in the Best patent mentioned above, in conventional fashion mounted directly on an axle with no support structure as described in the Best patent, or as otherwise desired. Each of a plurality of drive sprockets 534 is mounted coaxially with a row of skate wheels spanning correspondingly top pivotal connections 524 in lazy tong structures 520. Adjacent to each drive sprocket 534 is preferably located an upper freewheel 536 mounted coaxially with drive sprocket 534 and free to rotate with respect to that sprocket. Drive sprockets 534 may be pulleys, rollers with flanges having high coefficient of friction for moving products and conveyor 510, or as otherwise desired.

In the embodiment shown in FIGS. 5-8, two drive chains 550 are utilized, a first drive chain 550 extending over drive sprockets 534 on a first set of alternating rows of skate wheels 530, and the second drive chain 550 extending over the drive sprockets 534 on the other set of alternating rows of skate wheels 530.

Guide rollers 540 are provided in pairs: A pair of guide rollers 540 is positioned on a guide roller axle 542 which extends between bottom pivotal connections 526 of lazy tong structures 520. The guide rollers are rotatably mounted on the axles, positioned longitudinally between two successive drive sprockets 534 and upper freewheels 536, respectively, and substantially in alignment with them.

The chains 550 define tortuous paths within the conveyor structure 510 to apply power to drive sprockets 534 whose top tangents are approximately level with the surface defined by the top tangents of the skate wheels 530 to transport product or articles on the conveyor 510.

Figure 6:
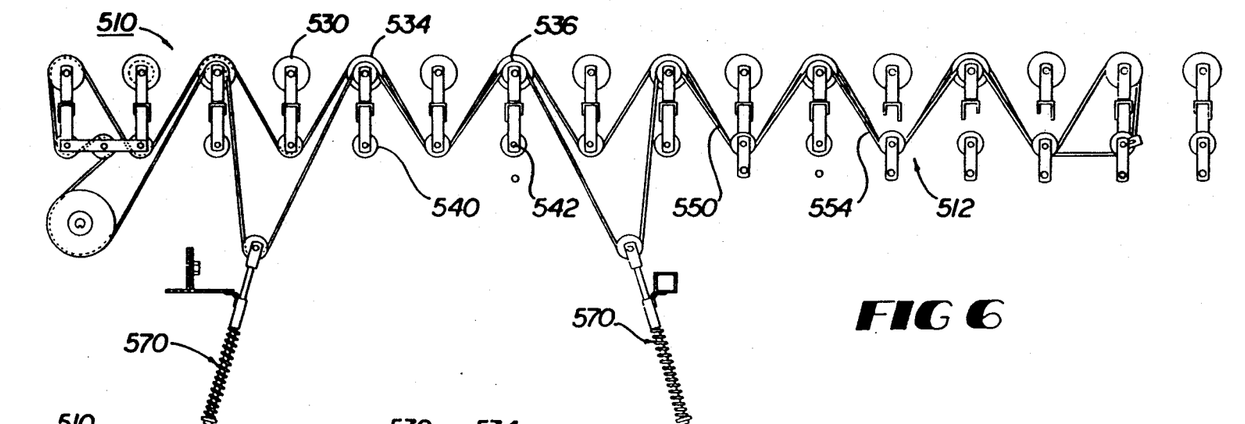
FIG. 6 is a schematic side cross sectional view of a portion of the conveyor of FIG. 5.
Figure 7:
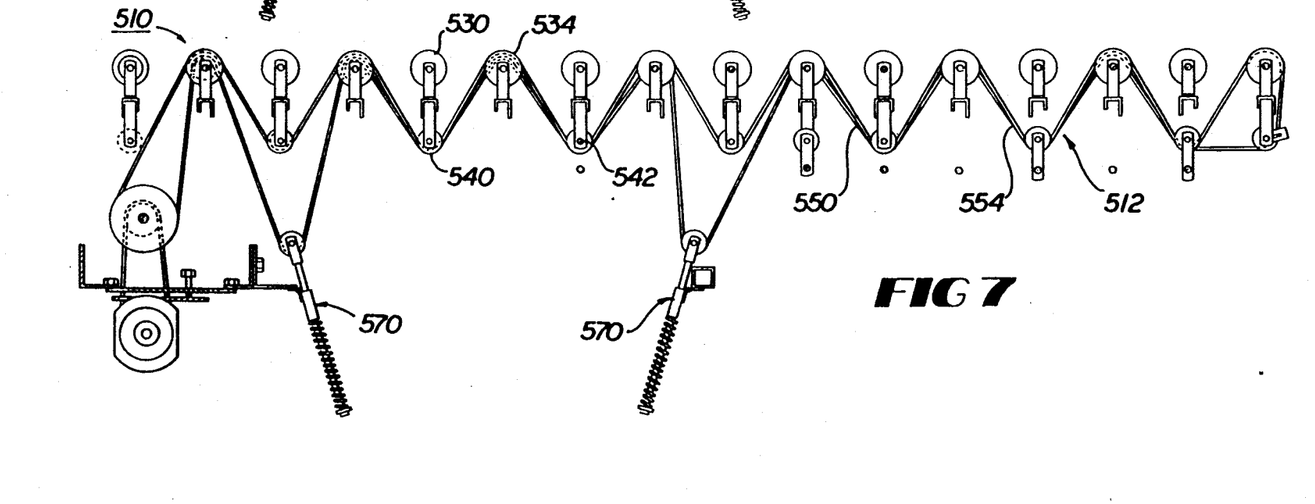
FIG. 7 is a schematic side cross sectional view of the opposite side of the conveyor of FIG. 5.
Figure 8:
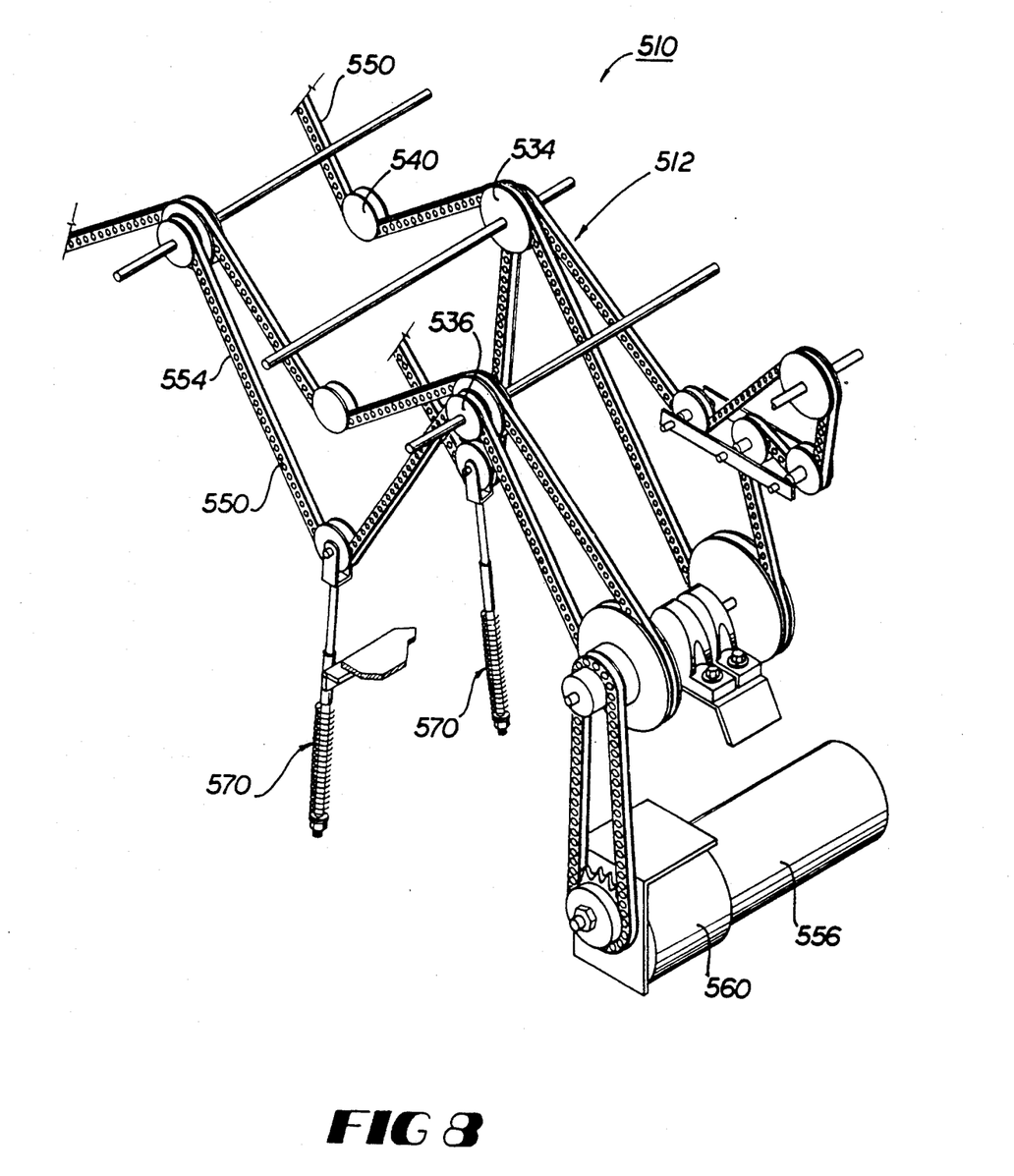
FIG. 8 is a perspective schematic view of a portion of the conveyor of FIG. 5, focusing on the drive chain path.

As shown perhaps best in FIGS. 6 and 7, the path 554 length of drive chain 550 remains approximately constant as conveyor 510 is expanded or contracted because as the drive sprockets 534 and upper freewheels 536 on the one hand, and the guide rollers 540 on the other hand, move horizontally with respect to each other, they also move in converse relationship vertically with respect to each other. Tensioners 570 as described above may be utilized to accommodate changes in path 554 length. Power sources 556 as described above may be used to power drive chains 550 and thus the conveyor 510.

Adaptations and modifications may be made to the embodiments described above without departing from the scope or spirit of the invention.

What is claimed is:

1. An chain-driven expandable powered conveyor having elongated rollers, comprising:
    (a) a first and a second lazy tong structure oriented substantially parallel to each other, each structure comprising a first set and a second set of generally parallel bars, each bar in the first set pivotally connected at a crux connection to a bar in the second set, a plurality of bars in the first set pivotally connected to bars in the second set at top pivotal connections, and a plurality of bars in the first set pivotally connected to bars in the second set at bottom pivotal connections;
    (b) a plurality of elongated roller structures, each connected to corresponding top pivotal connections in the first and second lazy tong structures, each comprising:
        (1) an elongated roller; and
        (2) a chain sprocket connected to the roller; a plurality of the elongated roller structures further comprising an upper freewheel disposed substantially coaxially with, and substantially free to rotate with respect, to the elongated roller;
    (c) a plurality of guide roller structures, each connected to a lazy tong structure, comprising:
        (1) a support member connected to a lazy tong structure;
        (2) a guide roller rotatably connected to the support member and substantially aligned with respect to the chain sprockets connected to the elongated rollers; and
        (3) a lower freewheel rotatably connected to the support member and substantially aligned with respect to the upper freewheels;
    (d) a power source connected to a drive sprocket;
    (e) a chain tensioner means for exerting force in order to draw a drive chain against the chain sprockets; and
    (f) a drive chain extending over the chain sprockets connected to the elongated rollers, under the guide rollers to draw the chain against the chain sprockets, over a plurality of the upper freewheels, and under a plurality of the lower freewheels.

2. A conveyor according to claim 1 in which a plurality of the elongated roller structures further comprise an axle connected to corresponding top pivotal connections in the first and second lazy tong structures, on which the elongated roller is rotatably disposed.

3. A conveyor according to claim 2 in which the axle forms part of the top pivotal connections.

4. A conveyor according to claim 1 comprising a plurality of elongated roller structures in which the chain sprocket is mounted to the elongated roller.

5. A conveyor according to claim 1 in which all elongated roller structures include an upper freewheel disposed substantially coaxially with the elongated roller.

6. A conveyor according to claim 1 in which a plurality of the guide roller structures further comprise at least one link connecting the support member to a crux connection in a lazy tong structure.

7. A conveyor according to claim 1 in which a plurality of the guide roller structures comprise a pair of links connected to corresponding crux connections in the first and second lazy tong structures, the support member is connected to the links, and the support member is an axle.

8. A conveyor according to claim 1 in which a plurality of the guide rollers of the guide roller structures are sprockets.

9. A conveyor according to claim 1 in which the speed of the power source may be varied.

10. A conveyor according to claim 1 in which the tensioner means comprises a mount connected to the conveyor, a shaft connected to the mount in sliding fashion, a spring connected to the mount and the shaft in order to apply force to the shaft, and a roller connected to the shaft in rotating fashion and over which the drive chain rides.

11. A conveyor according to claim 10 in which the tensioner means further includes a pair of crevasse rollers connected to the conveyor and positioned so that the tensioner roller is located between them with respect to the drive chain.

12. A conveyor according to claim 1 in which the drive chain travels over upper freewheels of each elongated roller structure.

13. A conveyor according to claim 1 further comprising a sequence of elongated roller structures connected to the lazy tong structures and in which the drive chain travels over upper freewheels of alternating elongated roller structures in the sequence.

14. An expandable powered conveyor having elongated rollers, comprising:
    (a) a first and a second lazy tong structure oriented substantially parallel to each other, each structure comprising a first set and a second set of generally parallel bars, a plurality of bars in the first set pivotally connected at crux connections to bars in the second set, a plurality of bars in the first set pivotally connected to bars in the second set at top pivotal connections, and a plurality of bars in the first set pivotally connected to bars in the second set at bottom pivotal connections;

(b) a plurality of elongated roller structures, each connected to the first and second lazy tong structures and each comprising an elongated roller;

(c) a plurality of sprocket structures, each comprising:
   (1) a support structure connected to at least one of the lazy tong structures;
   (2) a drive sprocket rotatably connected to the support structure; and
   (3) at least one orbital pulley connected to the drive sprocket to rotate with the drive sprocket;

(d) a plurality of upper freewheels connected to at least one of the lazy tong structures;

(e) a plurality of guide roller structures, each connected to at least one lazy tong structure, comprising:
   (1) a support structure connected to at least one lazy tong structure; and
   (2) at least one guide roller rotatably connected to the support structure;

(f) at least one power source connected to a power sprocket which is substantially aligned with a plurality of the drive sprockets;

(g) a drive chain contacting a plurality of the drive sprockets, freewheels, and guide rollers; and (h) a plurality of belts, each contacting an orbital pulley and at least one of the elongated rollers.

15. An expandable conveyor according to claim 14 in which each sprocket structure support structure comprises an axle connected to both lazy tong structures.

16. An expandable conveyor according to claim 15 in which the axles are connected to crux connections in the lazy tong structures.

17. An expandable conveyor according to claim 16 in which the axles form part of the crux connections to which they are connected.

18. An expandable conveyor according to claim 16 in which the sprocket structures are connected to alternating crux connections in the lazy tong structures.

19. An expandable conveyor according to claim 14 in which each sprocket structure includes two orbital pulleys connected to the sprocket to rotate with the sprocket.

20. An expandable conveyor according to claim 14 in which each of the upper freewheels is connected to a sprocket structure.

21. An expandable conveyor according to claim 14 in which each of the upper freewheels is connected to a sprocket structure coaxially with the sprocket and the orbital pulleys.

22. An expandable conveyor according to claim 14 in which each guide roller structure comprises a pair of lateral links connected to adjacent bottom pivotal connections in each lazy tong structure, a vertical link connected to each pair of lateral links, an axle connected to the vertical links, and at least one guide roller rotatably mounted on the axle.

23. An expandable conveyor according to claim 22 in which the lengths of the lateral links are not constant.

24. An expandable conveyor according to claim 22 in which the lengths of the lateral links are constant.

25. An expandable conveyor according to claim 22 in which the lengths of the vertical links are not constant.

26. An expandable conveyor according to claim 22 in which the lengths of the vertical links are constant.

27. An expandable conveyor according to claim 22 in which, for each guide roller structure, two guide rollers are mounted on the axle, one guide roller is substantially aligned with a plurality of the sprockets and the other guide roller is substantially aligned with a plurality of the upper freewheels.

28. An expandable conveyor according to claim 14 in which the lazy tong structures further comprise a plurality of braces, each connected to a top and a bottom pivotal connection, and the elongated roller structures are connected to the braces.

29. An expandable powered conveyor having elongated rollers, comprising:

(a) a first and a second lazy tong structure oriented substantially parallel to each other, each structure comprising a first set and a second set of generally parallel bars, a plurality of bars in the first set pivotally connected at crux connections to bars in the second set, a plurality of bars in the first set pivotally connected to bars in the second set at top pivotal connections, and a plurality of bars in the first set pivotally connected to bars in the second set at bottom pivotal connections, and a plurality of braces connected to the top and bottom pivotal connections;

(b) a plurality of elongated roller structures, each connected to corresponding braces in the first and second lazy tong structures and each comprising an elongated roller;

(c) a plurality of sprocket structures, each comprising an axle connected to the lazy tong structures, a drive sprocket rotatably mounted on the axle, and two orbital pulleys rotatably connected to the sprocket to rotate with the sprocket;

(d) a plurality of upper freewheels, each rotatably mounted on a sprocket axle;

(e) a plurality of guide roller structures, each comprising a pair of lateral links connected to adjacent bottom pivotal connections in each lazy tong structure, a vertical link connected to each pair of lateral links, an axle connected to the vertical links, a first guide roller rotatably mounted on the axle and substantially aligned with a plurality of the sprockets and a second guide roller rotatably mounted on the axle and substantially aligned with a plurality of the upper freewheels;

(f) at least one power source connected to a power sprocket which is substantially aligned with a plurality of the drive sprockets;

(g) a drive chain contacting a plurality of the drive sprockets, freewheels, guide rollers and the power sprocket;

(h) a chain tensioner adapted to draw the chain against the drive sprockets; and (i) a plurality of belts, each contacting an orbital pulley and at least one elongated roller.

30. An expandable conveyor according to claim 29 in which the sprocket structures are connected to crux connections in the lazy tong structures.

31. An expandable conveyor according to claim 30 in which the sprocket structures are connected to alternating crux connections in the lazy tong structures.

32. An expandable conveyor according to claim 29 in which the tensioner comprises a mount connected to the conveyor, a shaft connected to the mount in sliding fashion, a spring connected to the mount and the shaft in order to apply force to the shaft, and a roller connected to the shaft in rotating fashion and over which the drive chain rides.

33. An expandable conveyor according to claim 29 in which the speed of the power source may be varied.

34. An expandable conveyor according to claim 29 in which the drive chain travels over the sprockets and the upper freewheels, and under the guide rollers.

35. An expandable conveyor according to claim 29 in which the lengths of the lateral links are not constant.

36. An expandable conveyor according to claim 29 in which the lengths of the lateral links are constant.

37. An expandable conveyor according to claim 29 in which the lengths of the vertical links are not constant.

38. An expandable conveyor according to claim 29 in which the lengths of the vertical links are constant.

* * * * *

UNITED STATES PATENT AND TRADEMARK OFFICE
CERTIFICATE OF CORRECTION

PATENT NO. : 5,224,584

DATED : July 6, 1993

INVENTOR(S) : John W. Best, Bobby K. Flippo, Paul W. Irby

It is certified that error appears in the above-identified patent and that said Letters Patent is hereby corrected as shown below:

Column 2, line 68, delete the word "an" and insert --and-- therefor Signed and Sealed this Fifteenth Day of March, 1994

Attest:

BRUCE LEHMAN

Attesting Officer      Commissioner of Patents and Trademarks